United States Patent Office 3,022,316
Patented Feb. 20, 1962

3,022,316
3,6 BIS-PARA-SUBSTITUTED-PHENYL-AMINO-9-(2'-SULFO-PHENYL)XANTHENE
Herbert Bestian and Gustav Schäfer, Frankfurt am Main Hochst, and Ferdinand Quint, Frankfurt am Main, Germany, assignors to Farbwerke Hoechst Aktiengesellschaft vormals Meister Lucius & Brüning, Frankfurt am Main Hochst, Germany, a company of Germany
No Drawing. Filed Dec. 30, 1952, Ser. No. 328,832
Claims priority, application Germany Dec. 31, 1951
1 Claim. (Cl. 260—336)

The present invention relates to triphenylmethane dyestuffs and a process of preparing them.

U.S. applications Nos. 234,665 and 270,102, both now abandoned, for "Triphenylmethane dyestuffs," filed June 30, 1951 in the name of Gustav Schäfer and February 5, 1952 in the names of Gustav Schäfer and Ferdinand Quint, respectively, relate to a process of preparing dyestuffs of the triphenylmethane series, wherein a primary or secondary amine is reacted with a resorcinol-sulfophthalein of which the hydroxyl groups in para-positions with respect to the central carbon atom have been replaced by atoms or groups capable of being exchanged. The benzene nucleus carrying the sulfonic acid group may contain substituents. However, there are disclosed only symmetrical dyestuffs into which the same amino-compound has been introduced twice.

Now we have found that asymmetrical triphenylmethane dyestuffs can be made by reacting at a raised temperature a compound of the general formula

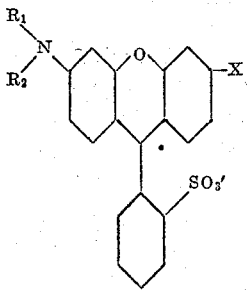

in which $R_1$ represents hydrogen or an aliphatic or cycloaliphatic radical, $R_2$ represents an aromatic radical, and X represents an atom or group capable of being exchanged, and in which the benzene nucleus carrying the sulfonic group may contain substituents, with a primary or secondary amine, and, if desired, sulfonating the condensation product so obtained.

In this manner there are obtained compounds of the general formula

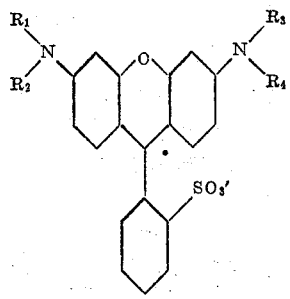

in which $R_1$ and $R_3$ each represent hydrogen or an aliphatic or cycloaliphatic radical, $R_2$ represents an aromatic radical, and $R_4$ represents an acyclic, isocyclic or heterocyclic radical, and in which the benzene nucleus carrying the sulfonic acid group may contain substituents, and the group

is different from the group

$R_1$ and $R_3$ advantageously represent hydrogen or lower alkyl radicals, such as a methyl, ethyl, propyl, isopropyl, butyl or amyl group. $R_4$ may represent an aliphatic, hydroaromatic or aromatic radical. Products containing in 4'-position a halogen atom or an alkoxy or carboxylic acid or sulfonic acid group, are of special importance.

The starting compounds of the formula given above can be made as described in U.S. application No. 327,668, filed December 23, 1952 now Patent No. 2,794,023, in the names of Herbert Bestian, Gustav Schäfer and Ferdinand Quint, for "Xanthenium compounds and a process of preparing them" by replacing the hydroxyl groups in para-position with respect to the central carbon atom in a resorcinol-sulfophthalein by atoms or groups capable of being exchanged, for instance, alkoxy groups or halogen atoms, and reacting the resulting intermediate product unilaterally with an aromatic amine. Those compounds serving as intermediate products, which contain two halogen atoms in para-position to the central carbon atom, can also be obtained by condensing a benzene-2-sulfonic acid-1-carboxylic acid with resorcinol in the presence of a phosphorus oxyhalide. There are generally used in the present process those starting materials in which the exchangeable substituent X represents chlorine. There may, however, also be used compounds in which X represents an alkoxy group, especially a methoxy group.

As starting materials for the present process there may be used compounds obtained by the unilateral condensation of, for example, 3.6-dichloro-9-phenylxanthhydrol-2'-sulfonic acid or 3.6-dichloro-9-phenylxanthhydrol-2'.4'-disulfonic acid or -4'-carboxylic acid 2'-sulfonic acid or -4'-methoxy-2'-sulfonic acid or -4'-chloro-2'-sulfonic acid with, for example, one of the following aromatic amino compounds:

aniline,
para-anisidine,
para-nitraniline,
2-nitro-4-toluidine,
para-aminoacetanilide,
1-amino-2.6-dimethyl-benzene,
1-methylamino-2.5-dimethylbenzene,
1-methylamino-2-methylbenzene,
1-amino-2-methyl-6-chlorobenzene,
1-amino-2-tri-fluoromethylbenzene,
1-amino-2-methyl-4-cyclohexylbenzene,
1-methylamino-2-methylbenzene,
1-amino-4-methylbenzene,
1-amino-4-ethoxybenzene,
1-amino-2-methoxybenzene-5-sulfonic acid diethylamide,
para-aminophenyl-β-oxyethyl-sulfone, 3-amino-4-methoxyyphenyl-β-oxyethyl-sulfone,
4-amino-3.5-dimethylphenyl-β-oxyethyl-sulfone,
4-amino-3.2'-dimethyl-azobenzene,
3-amino-N-ethylcarbazole,
1-(4'-aminophenyl)-3-methyl-5-pyrazolone,
1-amino-2-hydroxy-3-benzoic acid,
dehydrothio-para-toluidine sulfonic acid,
4-aminodiphenylamine-2-sulfonic acid,
1-aminobenzene-3-sulfonic acid,
1-amino-2-hydroxy-5-sulfo-3-benzoic acid.

Furthermore, there may be used many other primary or secondary aromatic amines.

In the process of the invention the aforesaid intermediate products are condensed with a primary or secondary amine. As primary and secondary amines there come into consideration compounds of the acyclic, isocyclic or heterocylic series. Aliphatic or aromatic aminosulfonic acids or amino-carboxylic acids may, for example, also be used. By a suitable choice of the components it is easily possible to obtain dyestuffs of which the solubility is sufficient for practical requirements. Furthermore, it is possible to use amines which contain hydroxyl and carboxyl groups in ortho-position, so that the resulting product can be after-treated with a metallizing agent, especially a chromium salt.

The process for making new dyestuffs is advantageously conducted in the presence of a solvent or diluent, for example, water or a monohydric or polyhydric alcohol. The reaction is in most cases carried out at a temperature above 100° C., preferably at 120–140° C. However, lower temperatures or, in case of amines reacting slowly, temperatures up to 200° C. may be used.

When the solubility of a dyestuff obtained by the present process is not sufficient for practical requirements, the dyestuff may be converted into a di- or tri-sulfonic acid by sulfonation.

Owing to the numerous possibilities available in choosing one or other of the amine components, the new process is capable of very wide variation. It provides valuable new dyestuffs having good properties of fastness.

The following examples serve to illustrate the invention, but they are not intended to limit it thereto, the parts being by weight unless otherwise stated, and the relationship of parts by weight to parts by volume being the same as that of the kilogram to the liter:

*Example 1*

4.9 parts of the intermediate product of the formula

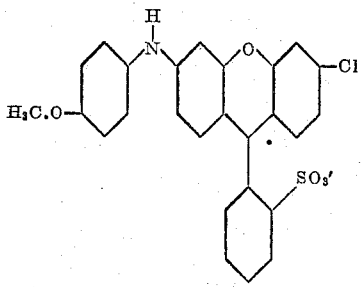

are heated to 130° C., while stirring vigorously, with 7 parts of sodium 1-amino-4-methoxybenzene-3-sulfonate in 30 parts by volume of glycol, and maintained at that temperature for 4 hours. Even after 15 minutes a test portion is soluble in water to give a clear violet solution. After cooling to 70° C., 150 parts by volume of sodium chloride solution of 15 percent strength are slowly added. The precipitated dyestuff is filtered off with suction. The filter cake having a bronze luster is washed repeatedly with a sodium chloride solution of 10 percent strength. After drying, 7.3 parts of a violet dyestuff powder having a bronze luster are obtained, which dissolves in water with a reddish blue coloration and dyes wool clear reddish blue tints which are fast to light.

Instead of sodium 1-amino-4-methoxybenzene-3-sulfonate the same quantity of sodium 1-amino-4-methoxybenzene-2-sulfonate may be used.

*Example 2*

5.2 parts of the intermediate product of the formula

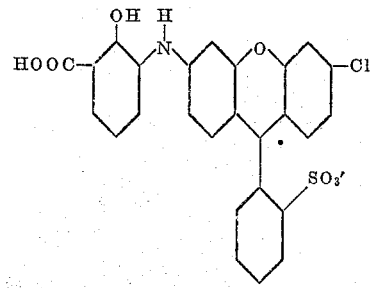

are stirred with 30 parts by volume of glycol. Thereupon 0.5 part of calcined sodium carbonate are added, and the whole is slowly heated to 80° C.–90° C. At that temperature mixture of 5.3 parts of 4-aminodiphenylamine-2-sulfonic acid and 1.06 parts of calcined sodium carbonate are introduced, and subsequently the whole is heated for 6 hours at 130° C. After being heated for a further 5 hours, 0.5 part of sodium carbonate is added. After cooling to 100° C., 150 parts by volume of a sodium chloride solution of 20 percent strength are slowly added dropwise to the thinly liquid deep blue solution. The dyestuff, which separates easily in a resinous state, is filtered off with suction and dried, after being washed with sodium chloride solution of 20 percent, strength. 12.2 parts of an almost black powder are obtained. It yields an afterchromed navy blue dyeing which is very fast to light and is distinguished by excellent properties of wet fastness.

*Example 3*

5.3 parts of the intermediate product of the formula

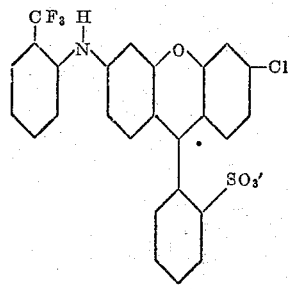

are stirred well with 30 parts by volume of glycol, and, after the addition of 10 parts by volume of 2.6-dimethylaniline, the whole is heated for 4½ hours at 140° C. The condensation product crystallises in small pale red crystals. After being cooled to 30° C., the whole is diluted with 50 parts by volume of alcohol, filtered with suction, and the filter residue is washed with alcohol. The yield amounts to 6.5 parts of a pale red powder which is insoluble in water and sparingly soluble in alcohol.

By sulfonation in monohydrate an easily soluble dyestuff is obtained, which dyes wool clear bluish red tints.

*Example 4*

5.3 parts of the intermediate product named in Example 3 are heated at the boil under reflux with 4.8 parts of sodium methylamino-ethane-sulfonate in 50 parts by volume of water. The dyestuff formed is obtained in theoretical yield from the deep red solution by evaporation to dryness or by salting out. It dyes wool very clear bright red tints.

*Example 5*

5.8 parts of the intermediate product of the formula

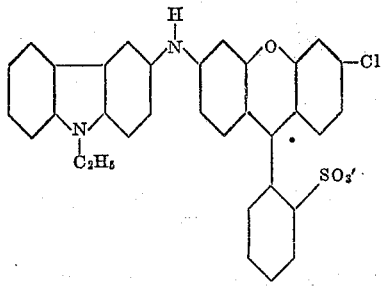

are heated for 2½ hours at 100–110° C. with 5.4 parts of sodium methylamino-ethane sulfonate in 30 parts by volume of glycol. The reaction proceeds rapidly in the course of which a homogeneous deep blue solution is formed. After cooling and stirring for several hours, the dyestuff separates in small iridescent crystals. After the slow addition of 50 parts of sodium chloride solution of 20 percent strength, the dyestuff is filtered off with suction, washed with sodium chloride solution of 10 percent strength, and dried. The yield amounts to 7.4 parts. The dyestuff dyes wool clear reddish blue tints.

*Example 6*

3.9 parts of the intermediate product of the formula are heated for 3 hours at 110–120° C. with 5.4 parts of 1-amino-4-cyclohexylbenzene in 25 parts of glycol. The colored condensation product crystallises from the solution after heating for a short time. The mixture is allowed to cool to 60° C., and is then diluted with 40 parts by volume of methanol. The product is filtered off with suction and washed on the filter with a little methanol. 4.55 parts of a brown powder having a greenish bronze luster are obtained. By sulfonation in cold monohydrate an easily soluble dyestuff is obtained, which dyes wool clear bluish red tints that are very fast to light.

*Example 7*

5.8 parts of the intermediate product named in Example 5 are stirred well with 30 parts by volume of glycol. Then a mixture of 4.7 parts of 1-amino-2-hydroxy-5-sulfo-3-benzoic acid and 2.1 parts of calcined sodium carbonate are introduced at 80–90° C., and the whole is heated for 5 hours at 150–160° C. In the course of the last 2 hours 0.5 part of calcined sodium carbonate is added in portions. The dyestuff formed is salted out at 60° C.–70° C. with a saturated solution of sodium chloride and filtered off while hot. For further purification the moist filter cake is dissolved in 200 parts by volume of hot water and, after the addition of 20 parts of sodium chloride, the dyestuff acid is precipitated with 10 parts by volume of concentrated hydrochloric acid. 9.7 parts of a violet black powder having a slight bronze luster are obtained. The dyestuff dyes wool deep blue tints, which, when after-chromed, possess excellent properties of fastness.

*Example 8*

5.2 parts of the intermediate product of the formula

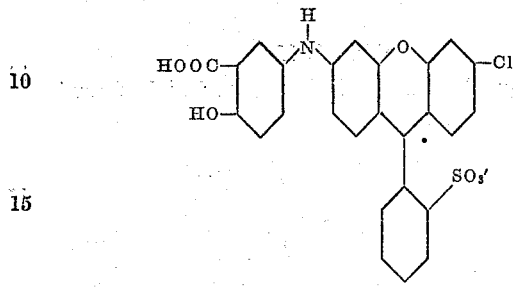

are mixed well for ½ hour with 0.5 part of calcined sodium carbonate in 30 parts by volume of glycol. 6 parts of sodium 1-amino-2-hydroxy-5-sulfo-3-benzoate are added, and the whole is heated for 4½ hours at 120–130° C., 0.5 part of calcined sodium carbonate is then added. A test portion of the deep blue solution dissolves in water yielding a clear and blue solution. The whole is allowed to cool to 80° C., and the dyestuff is precipitated by means of a saturated solution of sodium chloride. It is filtered off with suction and washed with a sodium chloride solution of 20 percent strength. The yield amounts to 10.15 parts of a powder having a slightly green bronze luster. The acid dyeing on wool can be after-chromed. There are obtained navy blue tints having excellent properties of fastness.

*Example 9*

2.5 parts of the intermediate product of the formula

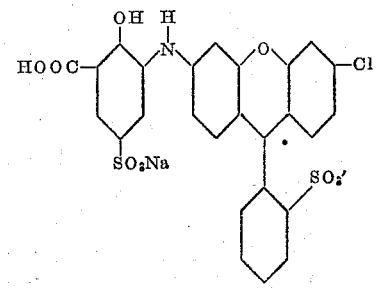

are stirred for 6 hours at 130° C. with 10 parts of 1-amino-4-ethoxybenzene. In order to eliminate the excess of the base, the mixture is stirred with dilute hydrochloric acid, the remaining dyestuff is then dissolved with a little hot water and sodium carbonate, the solution is then clarified and the dyestuff is salted out with sodium chloride. There are obtained 3.5 parts of the dyestuff which dyes wool navy blue tints which are very fast to light. In order to improve the properties of wet fastness, the dyestuff may be after-chromed.

*Example 10*

20 parts of the xanthenium compound of the formula

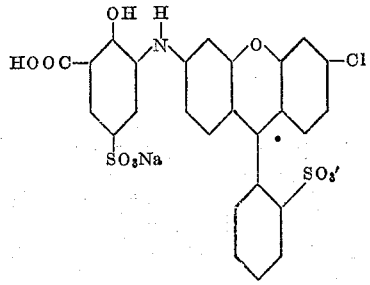

are stirred for 5 hours at 130° C. with 40 parts of 1- amino-2-hydroxybenzene-3-carboxylic acid and 5 parts of sodium carbonate in 150 parts of glycol. After diluting the mixture with water the dyestuff acid is precipitated by acidification, filtered off with suction, dissolved in water with the addition of sodium carbonate, and salted out. The dyestuff so obtained dyes wool navy blue tints which, when after-chromed, possess excellent properties of fastness.

Example 11

14.2 parts of the xanthenium compound of the formula

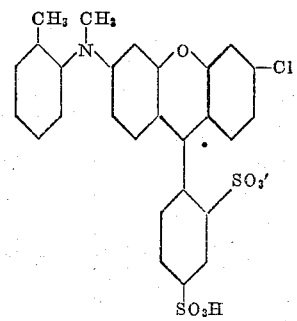

are heated for 5 hours at 120° C. with 10.5 parts of sodium 1 - amino - 4 - hydroxybenzene-3-sulfonate in 100 parts of diglycol. After diluting the mixture with water, the dyestuff acid is precipitated by acidification, filtered off with suction, dissolved in water with the addition of sodium acetate, and salted out. The dyestuff so obtained dyes wool dark violet tints having excellent properties of fastness.

Example 12

The xanthenium compound used in Example 11 is heated in diglycol with 10.25 parts of sodium 1-amino-4-methylbenzene-3-sulfonate; there is obtained by working as described in that example a violet dyestuff having very good properties of fastness.

Example 13

14.2 parts of the xanthenium compound used in Example 11 are stirred for 5 hours at 120° C. with 11.5 parts of sodium 1-amino-4-hydroxy-3-benzoate in 100 parts of diglycol, and the reaction mixture is worked up as described in that example. A blue dyestuff is obtained which dyes wool and silk navy blue tints which, when after-chromed, are distinguished by excellent properties of fastness.

Example 14

8.6 parts of a xanthenium compound of the formula

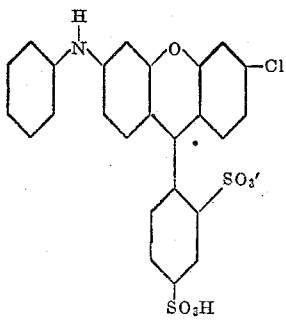

are stirred for 5 hours at 120° C. with 11.64 parts of sodium 1-amino-4-hydroxybenzene-3-sulfonate in 60 parts of diglycol. After diluting the mixture with water, the dyestuff acid is salted out, filtered off with suction, and dried. After weak sulfonation in monohydrate, a dyestuff is obtained which dyes wool and silk violet tints having very good properties of fastness.

Example 15

15 parts of xanthenium compound of the formula

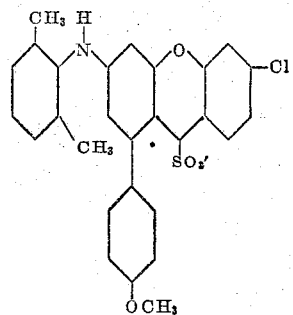

are stirred for 5 hours with 15 parts of sodium 1-amino-4-hydroxybenzene-3-sulfonate in 100 parts of diglycol, and the reaction mixture is worked up as described in Example 11. A dyestuff is obtained which dyes wool and silk reddish violet tints which are distinguished by excellent properties of fastness.

Example 16

15 parts of a xanthenium compound of the formula

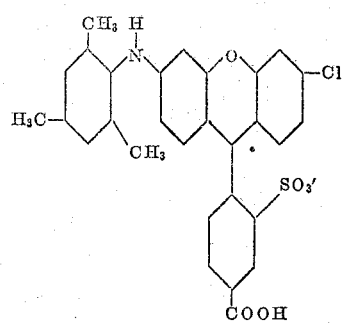

are heated for 5 hours at 120° C. with 15 parts of 1-amino-4-methylbenzene-3-sulfonic acid in 100 parts of diglycol. There is obtained from the reaction solution by working up as described in Example 11, a dyestuff which dyes wool and silk red violet tints having excellent properties of fastness.

Example 17

5 parts of the intermediate product of the formula

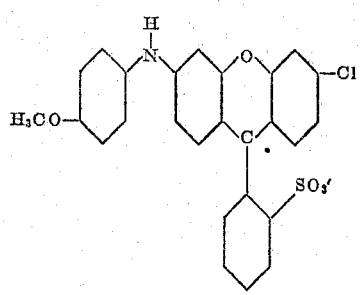

are heated slowly, while stirring vigorously, to 140° C.–150° C. with 10 parts of sodium 1-aminobenzene-4-sulfonate in 50 parts by volume of diglycol. Stirring is continued at that temperature for 2 hours. After cooling to 100° C., the melt is diluted with 200 parts by volume of water, and the mixture is filtrated, at 70° C.–80° C. after addition of 1 part of sodium carbonate. From the clear deep blue violet solution the dyestuff is salted out with 60 parts of sodium chloride, filtered off with suction, and washed with a sodium chloride solution of 10 percent strength. After drying there are obtained 7.3 parts of a brown bronzy powder which dyes wool and silk clear reddish blue tints having very good properties of wet fastness and excellent fastness to light.

Example 18

5.2 parts of the intermediate product of the formula

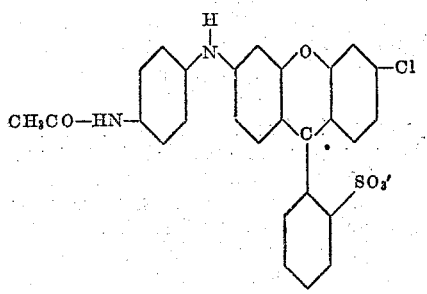

are heated, while stirring well, with 10 parts of sodium 1-aminobenzene-4-sulfonate in 30 parts by volume of diglycol for 3 hours at 135–140° C. and for ½ hour at 140–145° C. In the course of the last ½ hour there is added 0.5 part of sodium carbonate. The melt is dissolved in 300 parts by volume of water with the addition of 1 part of sodium carbonate and the dyestuff is salted out with sodium chloride. After drying, there are obtained 8.45 parts of a bronzy crystalline powder which dissolves in water with a reddish blue coloration and dyes wool and silk reddish blue tints having very good properties of fastness.

By using, instead of the above intermediate product, the derivative of N-methylacetanilide and otherwise working in the same manner, a dyestuff is obtained possessing the same good properties of fastness.

Example 19

4.2 parts of the intermediate product of the formula

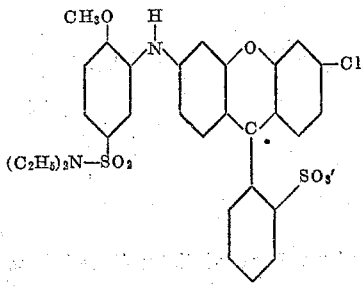

are heated, while stirring vigorously, for 6 hours at 140° C. with 6 parts of sodium 1-aminobenzene-4-sulfonate in 30 parts by volume of diglycol until a test portion dissolved in water yields a clear solution. After cooling to 100° C., there are added dropwise 100 parts by volume of a sodium chloride solution of 10 percent strength and at 70° C. 30 parts by volume of a saturated sodium chloride solution. After filtering with suction, washing the filter residue with sodium chloride solution and finally with a sodium chloride solution of 2½ percent strength, and drying, there is obtained a green bronzy dyestuff powder which dissolves easily in water and dyes wool and silk violet tints having good properties of fastness.

Example 20

4.6 parts of the intermediate product of the formula

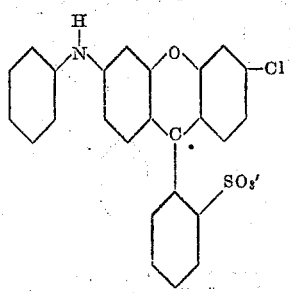

are stirred for 4½ hours at 130–140° C., with 6 parts of sodium 1-aminobenzene-4-sulfonate in 30 parts by volume of diglycol until a test portion dissolves easily in water. By adding dropwise at 50°–60° C. a sodium chloride solution of 15 percent strength, the dyestuff is precipitated in small olive green crystals. The yield amounts to 7.8 parts. Wool and silk are dyed violet tints having good properties of fastness.

By using, instead of 1-aminobenzene-4-sulfonic acid, 1-amino-2- or 3-sulfonic acid, dyestuffs having similar dyeing properties are obtained.

Example 21

4.9 parts of the intermediate product of the formula

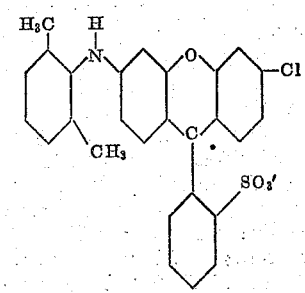

are heated slowly to 125–130° C. in 30 parts by volume of diglycol with 4.8 parts of sodium methylamino-ethane-sulfonate. The reaction mixture is stirred for 1 hour at that temperature. The reaction proceeds rapidly. After a short time a test portion dissolves in water yielding a clear bluish red solution. The melt is stirred into 300 parts by volume of a saturated sodium chloride solution. After the addition of 1.5 parts by volume of concentrated sulphuric acid, the dyestuff separates as a brown red powder having a slightly bronze luster, which dyes wool and silk brilliant red violet tints having very good properties of fastness.

By using, instead of the above intermediate product derived from vicinal meta-xylidine, the corresponding intermediate products derived from mesidine or 1-methyl-amino-2.5-dimethyl-benzene, there are obtained dyestuffs yielding similar brilliant tints which are distinguished by the same good properties of fastness.

Example 22

5.7 parts of the intermediate product of the formula

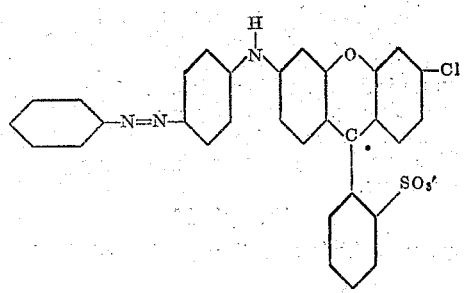

are heated for 1 hour at 110–120° C. with 3.2 parts of sodium methylamino-ethane-sulfonate in 30 parts by volume of diglycol until a sample dissolves in water yielding a clear solution. The dyestuff crystallises in the form of green coarse crystals having a bronze luster. After dilution with 10 parts by volume of alcohol, the product is filtered off with suction at 90° C. and washed with a little warm glycol and alcohol. 6.3 parts of an olive green bronzy crystalline powder are obtained which dissolves in water yielding a clear solution which is initially blue and later turns violet, and which dyes wool and silk navy blue tints having very good properties of fastness.

Example 23

5.7 parts of the intermediate product of the formula

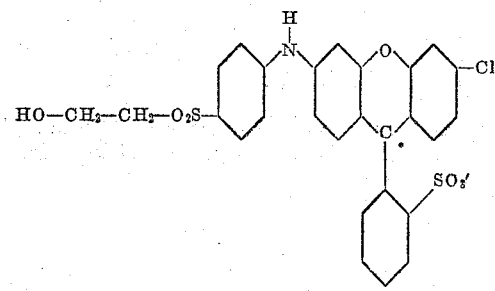

are stirred for 4 hours at 130° C.–140° C. with 10 parts by volume of vicinal meta-xylidine and 30 parts by volume of diglycol until the melt has become homogeneous and a test portion is soluble in alcohol yielding a clear bluish red solution. While still warm the melt is stirred into 150 parts by volume of water and 10 parts by volume of concentrated hydrochloric acid. In order to obtain a crystalline product the mixture is kept for 2 hours at 60° C.–70° C. After filtering the mixture with suction and washing the filter residue with water, a brown powder is obtained which becomes soluble in water upon sulfonation in monohydrate at 40° C.–50° C. 9 parts of a brown powder are obtained which dyes wool and silk in red violet tints having good properties of fastness.

If the substitution product of the above intermediate product containing a methoxy group in ortho-position with respect to the amino group is used as intermediate product, a dyestuff having similar properties is obtained.

Example 24

5.6 parts of the condensation product of the formula

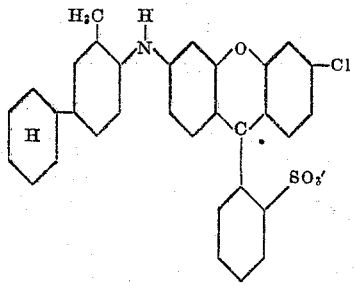

are stirred for 4 hours at 150°–160° C. with 10 parts by volume of vicinal meta-xylidine in 20 parts by volume of glycol. The dyestuff separates in the form of coarse bronzy crystals. After cooling to about 80° C., 20 parts by volume of methanol are cautionsly added dropwise and the mixture if filtered with suction. 5–6 parts of an olive green crystalline powder having a marked bronzy luster are obtained. After sulfonation a dyestuff is obtained which dyes wool and silk violet tints having good properties of fastness.

Example 25

5.1 parts of the intermediate product of the formula

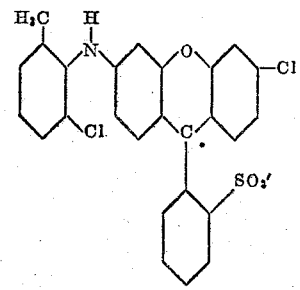

are heated for 2 hours at 150° with 10 parts by volume of vicinal meta-xylidine in 20 parts by volume of glycol during which the dyestuff separates in the form of pale red crystals. After cooling, the mixture is diluted with 40 parts by volume of alcohol and the product is filtered off with suction. After sulfonation the dyestuff dyes wool and silk pure red tints having good properties of fastness.

Example 26

5.2 parts of the intermediate product named in Example 24 are slowly heated to 130–140° C. with 7 parts of sodium 1-amino-4-methoxybenzene-3-sulfonate in 30 parts by volume of glycol, and the mixture is stirred for 5 hours. Before the last hour there is added 0.5 part of sodium carbonate. After cooling to 80° C., 50 parts by volume of a sodium chloride solution of 20 percent strength are added dropwise, the crystalline dyestuff is filtered off with suction, and washed wtih a sodium chloride solution of 10 percent strength until the washings, which are initially brown-red, become clear and have a weak bluish red coloration.

The yield amounts to 9.1 parts. The dyestuff dyes wool and silk reddish blue tints having good properties of fastness.

By using the intermediate product used in Example 5 and working as described in this Example 26, a dyestuff is obtained which dyes wool and silk navy blue tints having excellent properties of fastness.

Example 27

4 parts of the intermediate product of the formula

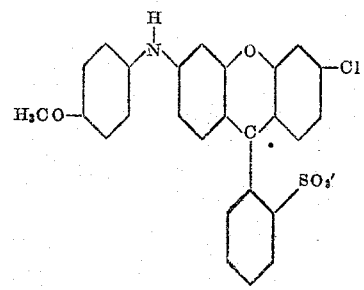

in 23 parts by volume of diglycol are heated to 110° C. After the addition of 7.5 parts by volume of diethylamine, the temperature is raised to 130° C. in the course of 30 minutes and that temperature is maintained for 2 hours while stirring. The deep violet melt is stirred in dilute hydrochloric acid, and the precipitated dyestuff is boiled with dilute hydrochloric acid in order to remove the last traces of the base. 4.3 parts of a bronzy green crystalline powder are obtained, which, when sulfonated in monohydrate, dye wool and silk violet tints having good properties of fastness.

Example 28

4 parts of the intermediate product of the formula

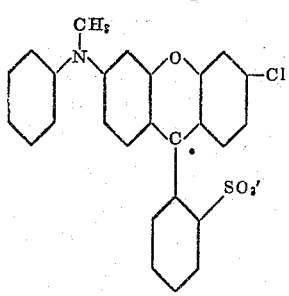

are dissolved at 100° C. in 15 parts by volume of diglycol and, after the addition of 7.5 parts by volume of diisobutylamine, the whole is stirred for 3 hours at 120–125° C. The melt is boiled twice with dilute hydrochloric acid, the dyestuff assuming a resinous form. After pulverisation, a red brown powder having a brassy luster is obtained, which, after sulfonation, dyes wool and silk clear red violet tints having good properties of fastness.

Example 29

4 parts of the intermediate product of the formula

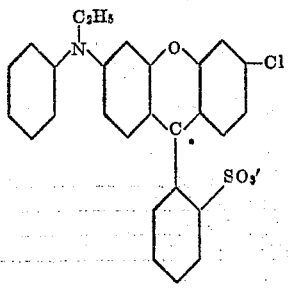

in 15 parts by volume of diglycol are heated to 130° C. and, after the addition of 7.5 parts of volume of (n)-butylamine, the mixture is stirred for 3 hours at 135–140° C. After stirring the violet red melt twice with dilute hydrochloric acid, a brick red crystalline powder having a brassy luster is obtained, which, after sulfonation, dyes wool and silk clear bluish red tints having very good properties of fastness.

Example 30

2 parts of the intermediate product of the formula

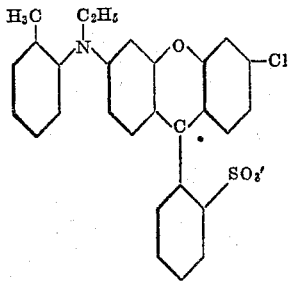

are treated for 6 hours at 160° C. with 30 parts of 1-amino-2.6-dimethylbenzene. Subsequently the excess of the base is extracted with dilute hydrochloric acid, the dyestuff obtained is dried, and converted by sulfonation in sulfuric acid into a form easily soluble in water. The dyestuff dyes wool bluish red tints.

Example 31

3.5 parts of the intermediate product of the formula

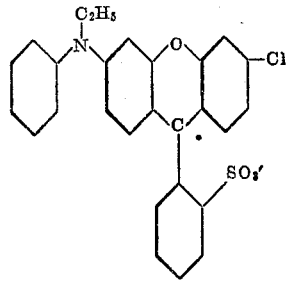

are melted at 150° C. with an excess of N-butyl-aniline. The melt is stirred with hydrochloric acid, and the dyestuff is sulfonated in known manner until it is soluble in sodium acetate solution with the aid of heat. It dyes wool red violet tints.

Example 32

3 parts of the intermediate product of the formula

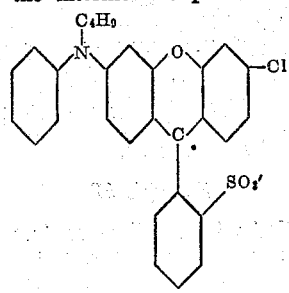

are stirred for 5 hours at 120° C. with 20 parts of 1-amino-4-ethoxybenzene. 3.5 parts of a blue violet dyestuff are obtained, which can easily be sulfonated.

Example 33

3 parts of the intermediate product of the formula

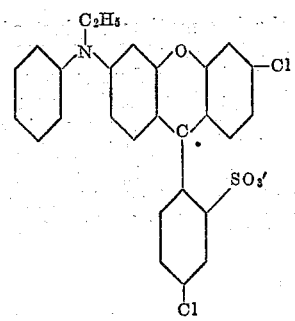

are treated for 6 hours at 130° C. in 30 parts by volume of glycol with 5 parts of sodium 1-aminobenzene-2-sulfonate. The mixture is diluted with sodium chloride solution, filtered, the filter residue is dissolved in dilute sodium carbonate solution, and the dyestuff is precipitated with sodium chloride. It dyes wool red violet tints.

Example 34

5 parts of the intermediate product of the formula

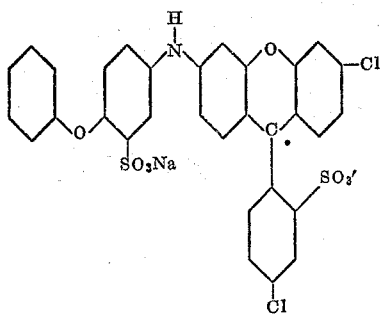

are treated at 130° C. with 30 parts of 1-amino-4-ethoxybenzene. When, after 4–5 hours, the exchange of the halogen atom is terminated, the excess of the base is removed with dilute mineral acid and the dyestuff is purified by recrystallisation. It dyes wool reddish blue tints.

Example 35

3 parts of the intermediate product mentioned in Example 27 are stirred in 16 parts by volume of diglycol with 3 parts by volume of 2.4.6-trimethylhexahydroaniline for 2–3 hours at 140° C. After 1 hour the dyestuff crystallises from the dark violet melt in the form of small green iridescent needles. By boiling with dilute hydrochloric acid the dystuff is freed from the excess of the amine, and is then sulfonated in sulfuric acid monohydrate. A dark violet powder is obtained which dyes wool and silk reddish violet tints having good fastness properties.

Example 36

4 parts of the intermediate product of Example 28 are heated at 185–190° C. with 15 parts by volume of diglycol and 3 parts by volume of N-cyclohexyl-aniline for 2–3 hours. The melt is worked up in known manner and a red violet dyestuff is obtained which, after sulfonation, dyes wool and silk reddish violet tints having very good properties of fastness. By using, instead of N-cyclohexylaniline, 1.2.3.4-tetrahydro-1-naphthylamine, a dyestuff is obtained which dyes wool and silk violet tints having good properties of fastness.

*Example 37*

4.15 parts of the intermediate product mentioned in Example 29 are heated for 2 hours at 180–220° C. with 3 parts by volume of N-cyclohexyl-ortho-toluidine in 15 parts by volume of diglycol. The violet dyestuff is boiled with dilute hydrochloric acid, and after sulfonation in sulfuric acid monohydrate, dyes wool and silk clear bluish red tints having very good properties of fastness.

*Example 38*

2.7 parts of the intermediate product of Example 28 are heated for 1½–2 hours at 170° C.–180° C. in 7 parts by volume of diglycol with 2.5 parts by volume of cyclohexylamine with the addition of 0.01 part by volume of perchloric acid of 70 percent strength. The dyestuff obtained from the bluish red melt is freed from the excess of the amine by means of dilute hydrochloric acid. A brilliant red powder is obtained which, after sulfonation, dyes wool and silk red tints having good properties of fastness.

We claim:
The compound of the formula

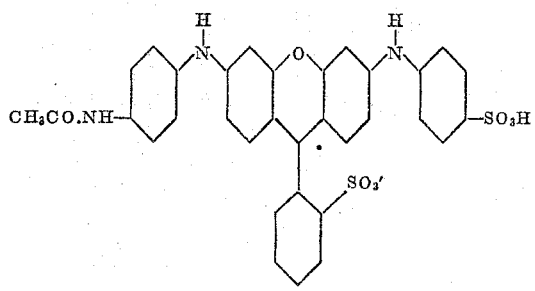

References Cited in the file of this patent
UNITED STATES PATENTS

| | | |
|---|---|---|
| 573,299 | Sandmeyer | Dec. 15, 1896 |
| 1,006,738 | Emmerich | Oct. 24, 1911 |
| 1,981,516 | Kyrides | Nov. 20, 1934 |
| 2,153,059 | Eckert et al. | Apr. 4, 1939 |

FOREIGN PATENTS

| | | |
|---|---|---|
| 18,017 | Great Britain | July 2, 1898 |
| 848,231 | Germany | Sept. 1, 1952 |

OTHER REFERENCES

Orndorff et al.: J. Am. Chem. Soc., vol. 46, pages 1896, 1898 and 1906 (1924).

Orndorff: J. Am. Chem. Soc., vol. 50, pages 1755–1762 (1928).